United States Patent Office.

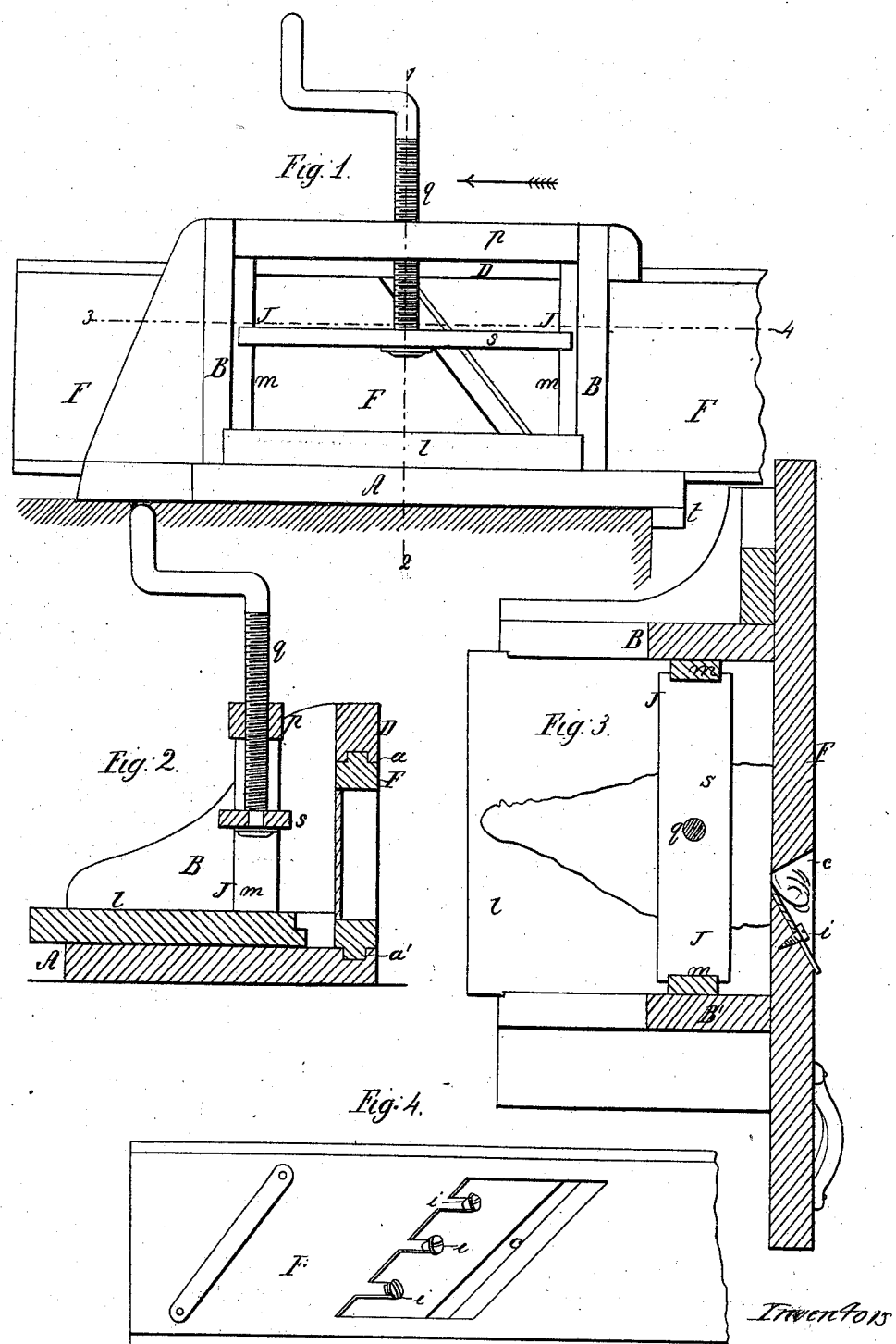

D. H. MUNDY, AND H. W. HOFFMAN, OF CAMDEN, NEW JERSEY.

Letters Patent No. 89,787, dated May 4, 1869.

IMPROVED MEAT-CUTTER.

The Schedule referred to in these Letters Patent and making part of the same.

*To all whom it may concern:*

Be it known that we, D. H. MUNDY and H. W. HOFFMAN, of Camden, New Jersey, have invented an Improved Meat-Cutter; and we do hereby declare the following to be a full, clear, and exact description of the same.

Our invention consists—

First, of a sliding frame, to which the piece of meat, or other article to be cut, is secured; and Secondly, in the combination with the said sliding frame, of a reciprocating cutter, arranged at right angles to the same, all as fully described hereafter.

In order to enable others to make and use our invention, we will now proceed to describe its construction and operation, referring to the accompanying drawing, which forms a part of this specification, and in which—

Figure 1 is a side view of our improved meat-cutter;

Figure 2, a sectional view of the same, on the line 1–2, fig. 1,

Figure 3, a sectional plan view on the line 3–4, fig. 1; and

Figure 4, a view of the cutting-blade, detached.

Similar letters refer to similar parts throughout the several views.

The base of the apparatus consists of a board, A, to which are secured vertical side-pieces, B and B', the latter being connected together, at their upper ends, by a cross-piece, D, which has, on its under edge, a groove, $a$, directly opposite to a corresponding groove, $a'$, formed in the base A.

The stock F, to which the cutting-blade H is attached, is arranged to slide on these grooves, $a$ and $a'$, close to the edges of the side-pieces B and B', the blade being secured, at a proper angle, within an opening, $c$, of the stock, by screws, $i\ i\ i$, in such a manner that its cutting-edge can be readily adjusted. (See figs. 3 and 4.)

J is a sliding frame, consisting of a block, $l$, adapted to grooves of the opposite side-pieces B and B', and of uprights, $m\ m$, connected together at the top by a cross-piece, $p$, the latter having, at its centre, a threaded opening, through which passes a handled screw-rod, $q$, attached at its lower end to a bar, $s$, which is arranged to slide vertically on the guides, or uprights $m$.

In using the apparatus, it is placed upon a table, or bench, in such a position that its projection, $t$, fig. 1, may rest against the edge of the same, this device effectually preventing the apparatus from slipping in the direction of the arrow.

The dried meat, which is to be sliced, or chipped, is placed upon the frame J, and is firmly secured to the same by the bar $l$, which is forced down upon it by means of its screw-rod, $q$. The operator then slides the frame and meat towards the cutter with one hand, while, with the other hand, he imparts a rapid reciprocating motion to the said cutter. In this way, uniform slices are cut from the meat as it is held against the cutter, and the thickness of these slices can be increased or diminished, as required, on properly regulating the blade H by means of its set-screws.

It will be evident that our invention, although especially intended for chipping dried meats, will answer effectually for slicing vegetables, &c.

We claim as our invention, and desire to secure by Letters Patent—

The sliding frame J, in combination with the reciprocating cutter H, when constructed and arranged, in respect to each other, upon a suitable frame, substantially as and for the purpose set forth.

In testimony whereof, we have signed our names to this specification, in the presence of two subscribing witnesses.

D. H. MUNDY.
H. W. HOFFMAN.

Witnesses:
JOHN WHITE,
HARRY SMITH.